United States Patent [19]
Ambs

[11] Patent Number: 5,704,465
[45] Date of Patent: Jan. 6, 1998

[54] COUPLING ASSEMBLY FOR BULK MATERIAL CONVEYING SYSTEMS

[75] Inventor: Richard W. Ambs, Williamsport, Pa.

[73] Assignee: The Young Industries, Inc., Muncy, Pa.

[21] Appl. No.: 630,854

[22] Filed: Mar. 4, 1996

[51] Int. Cl.$^6$ ........................................... B65G 19/14
[52] U.S. Cl. ............................................ 198/716; 198/733
[58] Field of Search .......................... 198/716, 733, 198/812, 813

[56] References Cited

U.S. PATENT DOCUMENTS

| | | | |
|---|---|---|---|
| 2,559,616 | 7/1951 | Hapman | 198/716 |
| 2,586,537 | 2/1952 | Hapman | 198/716 X |
| 5,186,312 | 2/1993 | Ambs et al. | 198/716 |

FOREIGN PATENT DOCUMENTS

| | | | |
|---|---|---|---|
| 1263360 | 12/1961 | France | 198/716 |

*Primary Examiner*—James R. Bidwell
*Attorney, Agent, or Firm*—Lalos & Keegan

[57] ABSTRACT

An improved coupling assembly is disclosed for use in bulk material conveying systems. The coupling assembly includes a first tubular section having an annular flange. The assembly receives an endless rope assembly with spaced disks for moving bulk material including powdered, pelletized, and granulated material. A second tubular section has a portion extending into the first tubular section secured with first and second coupling members including a section overlying and engaging a portion of the second tubular section. A first flange section is disclosed which mates with a laterally projecting flange section of the first tubular section and a second flange section. Sealing elements for sealing the assembly from the escape of fluidizing gasses are disposed between the first flange sections of the coupling members and the laterally projecting flange portion of the first tubular section and between the first and second tubular sections. Axial and radial forces applied to the sealing elements when coupling members are secured to the tubular sections provide a fluid tight seal.

11 Claims, 1 Drawing Sheet

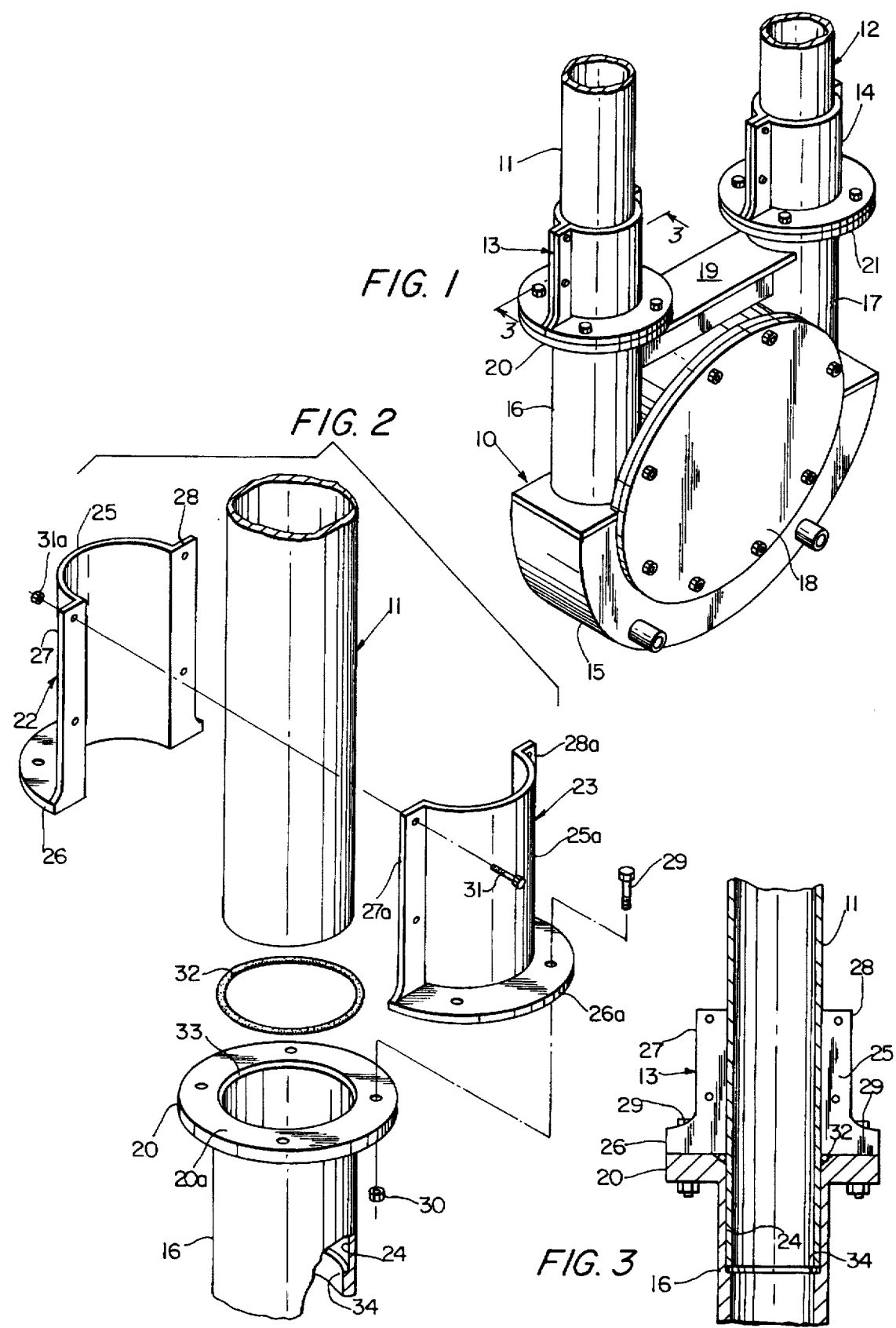

COUPLING ASSEMBLY FOR BULK MATERIAL CONVEYING SYSTEMS

This invention relates to a coupling assembly and more particularly to an improved coupling assembly suitable for use in bulk material conveying systems.

A type of system presently in use for conveying bulk materials such as powders, grains, pellets, chips, granules, flakes and the like, generally consists of a lower housing assembly into which material to be conveyed may be fed, an upper housing assembly usually provided with a material discharge means, a pair of tubular members interconnecting the housing assemblies to provide a circuitous path, and an endless rope assembly provided with spaced disc elements and movable along the circuitous path for receiving material from the lower housing assembly and conveying it to the upper housing assembly. Although the disc elements of the rope assembly in such systems function to physically convey the material through the system, the displacement of air caused by the high speed operation of the rope assembly has the effect of fluidizing the material being conveyed thus enhancing the conveying process. An example of such a system is illustrated and described in U.S. Pat. No. 5,186,312 which is incorporated herein by reference.

In the type of system as described, there usually is provided a motor driven sprocket in the lower housing assembly and an idler sprocket in the upper housing assembly about which the rope assembly is reeved. In assembling such a system, the rope assembly is fed through the assembled housing assemblies and tubular members providing the circuitous path of the rope assembly, the free ends of the rope assembly are secured together to form a closed loop and then selected components of the system are displaced along the circuitous path of the system to properly tension the rope assembly for proper operation. Such tensioning typically requires the partial disassembly of the means coupling certain component parts of the system together to permit the required displacement of adjoining parts and then the reassembly of such coupling means.

The means for coupling the components of such prior art systems together have been found not to be entirely satisfactory in that they do not readily provide for easily adjusting the displacement of adjoining components for effectively tensioning the rope assembly or for effectively sealing such adjoining components to both prevent leakage of the fluidization gas in such systems or the contamination of the fluidization gas by leakage of atmospheric gases into the closed conveying system.

Accordingly, it is the principal object of the present invention to provide an improved coupling assembly.

Another object of the present invention is to provide an improved coupling assembly suitable for use in bulk material conveying systems.

A further object of the present invention is to provide a coupling assembly for a bulk material conveying system of the type utilizing a rope assembly provided with spaced discs for conveying material through the system.

A still further object of the present invention is to provide a coupling assembly for a bulk material conveying system of the type utilizing a rope conveyor in the form a closed loop for conveying material through the system which facilitates the assembly and proper tensioning of the rope assembly.

Another object of the present invention is to provide an improved coupling assembly for a bulk material conveying system utilizing a rope assembly with a plurality of spaced discs for physically conveying the bulk material at a high speed to fluidize the material and thereby enhance the conveying process, which provides fluid-tight seals between adjoining components of the system thereby preventing leakage of the fluidization gas in the conveying system and the contamination of the fluidization gas by leakage of atmospheric gases into the system.

A further object of the present invention is to provide a coupling assembly for securing together adjoining components of a bulk material conveying system which is simple in design, comparatively easy to manufacture and assemble and highly effective in performance.

Other objects and advantages of the present invention will become more apparent to those persons having ordinary skill in the art to which the present invention pertains from the following description taken in conjunction with the accompanying drawing wherein:

FIG. 1 is a perspective view of a portion of a bulk material conveying system utilizing a rope assembly for conveying material therethrough, and further utilizing coupling assemblies embodying the present invention for securing adjoining components of the system together;

FIG. 2 is an enlarged, perspective view of two adjoining components and the associated coupling assembly shown in FIG. 1, illustrating the components in exploded relation; and FIG. 3 is a cross-sectional view taken along line 3—3 in FIG. 1.

Referring to FIG. 1 of the drawing, there is shown a partial view of a bulk conveying system of the type illustrated and described in aforementioned U.S. Pat. No. 5,186,312, which includes a housing assembly 10, a pair of tubular members 11 and 12, and a pair of coupling assemblies 13 and 14 which couple the tubular members to the housing assembly to form a part of the circuitous path of a rope assembly through the system. In addition to the specific system as illustrated and described in the aforementioned patent, a number of such housing assemblies and tubular members may be utilized in a variety of combinations to provide bulk conveying systems of various configurations.

Housing assembly 10 generally includes a main housing section 15 in which either a driven or idler sprocket is journaled, and a pair of tubular sections 16 and 17 which are disposed parallel to each other and substantially tangential relative to an arcuate portion of the circuitous path of the rope assembly through the housing section. The main housing section may be provided with a material feeding means, a material discharge means or merely a side cover plate as at 18 which provides access to the interior of the main housing section and the sprocket journaled therein. The tubular sections are provided with a bracing section 19 interconnecting the two sections, and a pair of annular flange portions 20 and 21 formed on the free ends thereof. The assembly may be of a fabricated or cast construction.

Tubular members 11 and 12 are axially aligned with tubular sections 16 and 17 of the housing assembly and are coupled thereto by coupling numbers 13 and 14 which are essentially identical in construction and function. As best shown in FIG. 2, coupling assembly 13 includes two identical members 22 and 23, which are adapted to be secured to annular flange portion 20 of the housing assembly and clamp onto adjoining tubular member 11 after the axial displacement of tubular member 11 relative to tubular section 16 has been adjusted to properly tension the rope assembly extending therethrough along the circuitous path in the system.

As best shown in FIG. 3, tubular section 16 includes an enlarged opening portion 24 having a diameter substantially equal to the outside diameter of tubular member 11 so that tubular member 11 may be received within such enlarged portion and displaced axially therein. Furthermore, the inside diameter of conduit number 11 preferably is similar to the inside diameter of tubular section 16 so that when tubular member 11 is received within enlarged opening portion 24 of tubular section 16, there will be a smooth transition of inside surfaces of the adjoining components to facilitate the flow of bulk material therethrough.

Coupling member 22 includes a semi-cylindrical section 25, an arcuate flange section 26 disposed at one end of section 25 and a pair of longitudinally extending, laterally projecting flange sections 27 and 28 disposed along the sides thereof. Semi-cylindrical section 25 has an inside diameter substantially equal to the outside diameter of tubular member 11 so that it will overlie a portion of tubular member 11 and cooperate with comparable section 25a of coupling member 23 to engage tubular member 11 in clamping relation. Arcuate flange sections 26 and 26a are provided with arcuate outer surfaces which are adapted to engage and mate with annular surface 20a of tubular section 16 and be secured thereto by a set of bolts 29 and nuts 30 when the free end of tubular member 11 is received within tubular section 16 and the semi-cylindrical portions of the coupling members engage the tubular member in overlying relation. The coupling members are clamped to tubular member 11 by means of lateral flange sections 27 and 28 of member 22 which register with comparable lateral flange sections 27a and 28a of coupling member 23. Arcuate flange sections 26 and 26a are secured to annular flange portion 20 by means of a set of bolts and nuts 31 and 31a. The coupling members may be of either a cast or fabricated construction, and each of the arcuate flange sections is disposed in a plane lying substantially perpendicular to the axis of the semi-cylindrical section thereof and the laterally projected sections each are disposed in a plane parallel to the axis of the semi-cylindrical section thereof.

In assembling the components as shown in FIG. 2, an O-ring 32 may be seated in an annular, beveled recess 33 provided in the end of tubular section 16. The end of tubular member 11 is inserted through the seated O-ring into the enlarged section of tubular section 16, possibly to the furthest extent with the edge of tubular member 11 engaging annular shoulder 34 in tubular section 16, coupling members 22 and 23 are positioned with flange sections 26 and 26a seated on annular flange portion 20, cylindrical sections 25 and 25a overlie and encompass tubular member 11 and flange portions 27 and 28 are disposed in opposed relation to flange sections 27a and 28a. Flange sections 26 and 26a may then be firmly secured to annular flange 20 by sets of nuts and bolts 29 and 30, and cylindrical sections 25 and 25a may be caused to engage tubular member 11 in clamping relation by means of sets of bolts and nuts 31 and 31a, drawing flange portions 27 and 28 together with flange sections 27a and 28a. Alternatively, the seal provided between annular flange section 20, flange sections 26 and 26a and tubular member 11 may consist of one or more strips of O-ring stock which may be positioned on the beveled surface of recess 33 with opposed ends thereof either physically engaging or adhesively secured together.

Under such assembled conditions, the components would be secured together as shown in FIG. 3 with tubular member 11 extending into tubular section 16, the clamping members being secured to the flange portion of tubular section 16 and the semi-cylindrical sections thereof firmly engaging tubular member 11 in clamping relation. Under such circumstances, the radial and axial forces applied by the coupling members would cause the O-ring to deform to provide a fluid-tight seal between not only tubular member 11 and tubular section 16, but also between arcuate flange sections 26 and 26a of the coupling members and annular flange portion 20 of tubular section 16, to prevent leakage of the fluidization gas from within or the contamination of the fluidization gas by leakage of atmospheric gases from without the system.

After the components of the entire system have been assembled as shown partially in FIG. 1 and more fully in the aforementioned patent, the rope assembly may be inserted through perhaps the discharge opening of the system until the free ends thereof meet which then may be secured together to form a closed loop. Under such conditions, the rope assembly will have a certain amount of slack which must be removed in order for the system to function properly. Such slack is removed and the rope assembly is properly tensioned by loosening the sets of nuts and bolts 31 and 31a of the coupling members to unclamp tubular members 11 and 12 relative to housing assembly 10, axially displacing tubular members 11 and 12 relative to tubular sections 16 and 17 of the housing assembly and then tightening bolt and nut assemblies 31 and 31a to reclamp the coupling members to tubular members 11 and 12. The rope assembly will then be properly tensioned to travel at a high speed to not only physically convey the bulk material to be conveyed but also to fluidize the material to enhance the conveying process. The fluid-tight seal provided by the axial and radial forces applied by the coupling members will prevent the escape of any material being conveyed through the junctions of the tubular members and the housing assemblies.

O-ring 32 may be formed of any suitable sealing material compatible with the material to be conveyed by the system. Preferably, the O-ring will have a diameter sufficient so that when the axial and radial forces applied when the coupling members are secured to the tubular sections and clamped to the adjoining tubular members, the O-ring will be compressed and distorted to provide an appropriate sealing action.

In the type of conveying system as described there may be provided a number of sprocket housings joined together with tubular members to make up a closed system. The drive and idler sprockets in such systems may be located at end, upper, lower or intermediate locations in such systems depending upon the particular usage. In any particular design of the system, the coupling arrangement may be used to not only provide a fluid tight seal between adjoining housing and tubular members but to allow for the spatial adjustment of such adjoining components for properly tensioning the rope assembly extending therethrough.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In an apparatus having an endless rope assembly provided with spaced discs for conveying bulk materials therethrough, an assembly comprising:

a first conduit section receiving said rope assembly therethrough, having a laterally projecting flange portion;

a second conduit section receiving said rope assembly therethrough;

one of said conduit sections having a portion projecting into the other of said conduit sections;

first and second coupling members, each including a section overlying and engaging a portion of said second conduit section, a first flange section engageable in mating relation with said laterally projecting flange portion of said first conduit section and a second flange section disposed in opposed relation with a comparable second flange section of the other of said coupling members;

sealing means disposed between said first flange sections of said coupling members and said laterally projecting flange portion of said first conduit section, and between said first and second conduit sections;

means for securing said first flange sections of said second members to said laterally projecting flange portion of said first conduit section, when engaged in mating relation; and means for securing said second flange sections of said coupling members together when disposed in opposed relation;

whereby said coupling members firmly engage and are secured to said first conduit section and firmly clamp onto said second conduit section to apply axial and radial forces on said sealing means to provide a fluid-tight seal between said conduit sections.

2. An assembly according to claim 1 wherein said sealing means comprises an O-ring.

3. An assembly according to claim 2 wherein said first conduit section includes an annular, beveled recess and said O-ring is seated therein.

4. An assembly according to claim 1 wherein said other of said conduit sections includes an enlarged opening section and said projecting portion of said one of said conduit sections is received within said enlarged opening section.

5. An assembly according to claim 1 wherein said other of said conduit sections is tubular and is provided with an enlarged opening section, said one of said conduit sections is tubular and said projecting portion of said one of said conduit sections is tubular and is received within said enlarged opening section of said other of said conduit section.

6. An assembly according to claim 5 wherein the inside diameters of said conduit sections including said projecting portion of said one conduit section are the same.

7. An assembly according to claim 1 wherein said laterally projecting flange portion of said first conduit section is annular, said overlying sections of each of said coupling members is semi-cylindrical, said first flange section of each of said coupling members is arcuate and said second flange sections of each of said coupling members are radially projecting relative to said overlying section thereof.

8. An assembly according to claim 7 wherein said sealing means comprises an O-ring.

9. An assembly according to claim 7 wherein said first conduit section includes an annular, beveled recess and said sealing means comprises an O-ring disposed in said recess.

10. An assembly according to claim 1 wherein said coupling members are of a cast construction.

11. An assembly according to claim 1 wherein said coupling members are of a fabricated construction.

* * * * *

UNITED STATES PATENT AND TRADEMARK OFFICE
CERTIFICATE OF CORRECTION

PATENT NO. : 5,704,465
DATED : January 6, 1998
INVENTOR(S) : Richard W. Ambs

It is certified that error appears in the above-identified patent and that said Letters Patent is hereby corrected as shown below:

claim 1, column 5, line 11, change "second" to -- coupling --.

Signed and Sealed this

Tenth Day of March, 1998

Attest:

BRUCE LEHMAN

Attesting Officer

Commissioner of Patents and Trademarks